(12) United States Patent
Keshavarzian et al.

(10) Patent No.: US 8,155,099 B2
(45) Date of Patent: Apr. 10, 2012

(54) METHOD OF OPERATING AN EVENT-DRIVEN, DELAY-CRITICAL WIRELESS SENSOR NETWORK

(75) Inventors: Abtin Keshavarzian, Palo Alto, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 859 days.

(21) Appl. No.: 12/245,217

(22) Filed: Oct. 3, 2008

(65) Prior Publication Data

US 2010/0085954 A1     Apr. 8, 2010

(51) Int. Cl.
*H04J 1/00* (2006.01)
(52) U.S. Cl. ........................................ 370/343
(58) Field of Classification Search .................. None
See application file for complete search history.

(56) References Cited

U.S. PATENT DOCUMENTS

| | | | | |
|---|---|---|---|---|
| 6,094,425 | A * | 7/2000 | Auger et al. | 370/330 |
| 2005/0275530 | A1 * | 12/2005 | Kates | 340/539.22 |
| 2007/0076745 | A1 * | 4/2007 | Manjeshwar et al. | 370/448 |
| 2007/0093208 | A1 * | 4/2007 | Manjeshwar et al. | 455/63.1 |
| 2007/0129011 | A1 * | 6/2007 | Lal et al. | 455/20 |

OTHER PUBLICATIONS

Jamieson, Balakrishnan and Tay; "Sift: A MAC Protocol for Event-Driven Wireless Sensor Networks"; MIT Computer Science and Artificial Intelligence Laboratory, The Stata Center, MA; Dept. of Computer Science, National University of Singapore, Republic of Singapore; Wireless Sensor Networks Lecture Notes in Computer Science; LNCS 3868, pp. 260-275; 2006; Springer-Verlag Berlin Heidelberg 2006. (16 pages).

* cited by examiner

*Primary Examiner* — Yong Zhou
(74) *Attorney, Agent, or Firm* — Taft Stettinius & Hollister LLP

(57) ABSTRACT

A method of operating wireless devices includes providing a plurality of sender nodes each having a respective message to wirelessly send to a receiver node. A probability distribution is assigned to a plurality of frequency channels such that a respective probability of selection is assigned to each frequency channel. At least two of the probabilities of selection are unequal. A respective frequency channel is probabilistically selected for each of the sender nodes according to the probability distribution. The messages are wirelessly sent from the sender nodes to the receiver node in the selected frequency channels. The receiver node is used to sample a first one of the frequency channels and a second one of the frequency channels. The second frequency channel has a higher respective probability of selection than the first frequency channel. If the receiver node sensed a signal in both the first frequency channel and the second frequency channel during the sampling, the receiver node is tuned to the first frequency channel and receives a remainder of the message on the first frequency channel.

20 Claims, 8 Drawing Sheets channel selection probability

METHOD OF OPERATING AN EVENT-DRIVEN, DELAY-CRITICAL WIRELESS SENSOR NETWORK

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright © 2008, Robert Bosch GmbH, All Rights Reserved.

BACKGROUND OF THE INVENTION

1. Field of the Invention

The present invention relates to wireless sensor networks, and, more particularly, to wireless sensor networks that carry delay-critical messages.

2. Description of the Related Art

Collection of rare but delay-critical messages from a group of sensor nodes is a key process in many wireless sensor network applications. This is particularly important for security related applications like intrusion detection and fire alarm systems. An event sensed by multiple sensor nodes in the network can trigger the simultaneous transmission of many messages. In such cases, it is important that the first message be received quickly and that all the messages be eventually collected with low levels of latency.

With the transition of many automated tasks from a wired to a wireless domain, wireless sensor networks (WSNs) are being increasingly subjected to new application domains. Applications of critical nature have been the forte of wired networks due to wired networks' high levels of reliability. Despite the traditional use of wired networks, the ever-increasing reliability of WSNs coupled with their cost-effectiveness has led to the gradual adoption of WSNs for such critical applications as well. The nature of such applications, however, requires new Media Access Control (MAC) protocols for WSNs that meet the requirements and inspire sufficient confidence in the usage of WSNs.

The requirements for applications of critical nature can be fundamentally different from the applications for which known MAC protocols are designed. For example, energy is a valuable resource in sensor devices and most existing MAC protocols are optimized to conserve energy, trading off latency, throughput and other similar performance metrics in the process. These same protocols are typically not suitable when the application demands better performance at the expense of some additional energy. If reduction of latency is to be the primary issue with reduction of energy consumption being only a secondary issue, protocols need to be re-designed from that application perspective.

In some applications, wireless sensors are required to convey urgent messages to a centralized base station with minimum delay from the time the urgent messages are generated. These messages are triggered by events detected by sensor nodes, and the messages are intended to inform the base station so that the base station may take possible action. Such messages are triggered very rarely, and it may be desirable to reduce latency when such messages are triggered, even if some additional energy is expended during those times. Intrusion detection and fire alarm applications, for example, may require such low levels of latency. Even though the messages are typically correlated, the collection of all messages as opposed to just a subset of the messages provides valuable information which can be used for detection of false positives or post event analysis. For example, the European Standard EN 54-25 for fire alarm systems specifies the duration within which the first alarm should be reported and all alarms should be received at the base station. The challenges in designing WSN MAC protocols for such applications include the handling of a number of simultaneous messages without knowledge of how many messages will be simultaneously sent, and planning for possible interferences. Additionally, it is important to ensure implementation feasibility taking into account the additional constraints imposed on WSNs such as time synchronization and limited computation and storage capabilities.

MAC protocols for wireless sensor networks can be mainly classified into contention free, contention-based and energy saving protocols. Contention free protocols are mainly the ones based on Time-Division Multiple Access (TDMA) where slots are assigned to each node by the base station and each node sends its message (if it has one) only during its assigned slot. Such TDMA-based protocols perform very poorly when the number of nodes contending is unknown or keeps varying. In some applications, the number of nodes is rarely known, which makes TDMA-based schemes undesirable. Other contention free approaches, e.g., Frequency-Division Multiple Access (FDMA), face similar limitations.

Contention based protocols can be bifurcated into Carrier Sense Multiple Access-based (CSMA-based) or non-CSMA based. The IEEE 802.11 and 802.15.4 protocols are examples of CSMA protocols with the latter designed specifically for applications catered to by wireless sensor networks. These protocols use a variable sized contention window whose size is adjusted at each node based on the success of the node in sending its message, with each node picking a slot in this window using a uniform probability distribution. These protocols do a good job in handling scenarios with small number of nodes but do not handle a large number of simultaneous messages well. The Sift protocol was designed to overcome these deficiencies for WSN applications that need to handle such a large number of event-driven spatially co-related messages. Sift is also CSMA-based but uses a fixed size contention window. Nodes pick slots from a geometric probability distribution such that only a few nodes contend for the first few slots, and thus Sift handles a large number of messages easily. Protocols based on Aloha, on the other hand, do not sense the channel before transmission and rely on each node randomly picking a slot to transmit on, with the probability of transmission depending on the number of messages contending. When this number of contending messages is not known, these protocols do not adapt well. In general, CSMA-based protocols outperform-Aloha based protocols when the propagation time between nodes is small enough to make carrier sense useful.

What is neither disclosed nor suggested by the prior art is a method of handling delay-critical messages in a wireless sensor network with a reduced level of latency.

SUMMARY OF THE INVENTION

The present invention provides a method for collecting event-triggered urgent messages from a group of sensor nodes with reduced latency and without requiring any cooperation or pre-scheduling among the senders or between senders and receiver during protocol execution. The invention may reduce contention among nodes by using a combination of time multiplexing and frequency multiplexing. Multiple frequency channels may be used within time slots, and contention may be reduced by controlling the probability of selection of each channel by the nodes. In spite of the use of multiple channels, the presence of only one transceiver in all nodes including the receiver may be assumed.

The present invention may use a non-uniform distribution to control contention among nodes, and is non-CSMA based. The present invention separates message transmissions across different frequency channels with this non-uniform distribution. Thus, the method of the present invention may be free of hidden terminal issues. By using different frequency channels to separate the sender nodes, the present invention does not require tight time synchronization.

The invention comprises, in one form thereof, a method of operating wireless devices, including providing a plurality of sender nodes each having a respective message to wirelessly send to a receiver node. A probability distribution is assigned to a plurality of frequency channels such that a respective probability of selection is assigned to each frequency channel. At least two of the probabilities of selection may be unequal. A respective frequency channel is stochastically selected for each of the sender nodes according to the probability distribution. The messages are wirelessly sent from the sender nodes to the receiver node in the selected frequency channels. The receiver node is used to sample a first one of the frequency channels and a second one of the frequency channels. The second frequency channel may have a higher respective probability of selection than the first frequency channel. If the receiver node sensed a signal in the first frequency channel during the sampling, the receiver node is tuned to the first frequency channel and receives a remainder of the message on the first frequency channel. If the receiver node sensed no signal in first frequency channel, the receiver node is used to sample a second one of the frequency channels with lower priority level.

The invention comprises, in another form thereof, a method of operating wireless devices, including providing a plurality of sender nodes each having a respective message to wirelessly send to a receiver node. A probability distribution is assigned to a plurality of frequency channels such that a respective probability of selection is assigned to each frequency channel. Each of the probabilities of selection may be unequal. A respective frequency channel is probabilistically selected for each of the sender nodes according to the probability distribution. The messages are wirelessly sent from the sender nodes to the receiver node in the selected frequency channels. The receiver node is used to sample each of the frequency channels. At least one occupied one of the sampled frequency channels in which a signal was sensed by the receiver node during the sampling is identified. A highest priority one of the occupied frequency channels having a lowest assigned probability of selection among the occupied frequency channels is determined. The receiver node is tuned to the highest priority occupied frequency channel and receives a remainder of the message on the highest priority occupied frequency channel.

The invention comprises, in yet another form thereof, a method of operating wireless devices, including providing a plurality of sender nodes each having a respective message to wirelessly send to a receiver node. A plurality of frequency channels in which the messages may be sent is provided. A first subset of the frequency channels is selected. Priorities are assigned among the selected frequency channels in the first subset. The messages are wirelessly sent from the sender nodes to the receiver node in corresponding ones of the selected frequency channels in the first subset. The receiver node is used to sample each of the selected frequency channels in the first subset. At least one occupied one of the sampled frequency channels in which a signal was sensed by the receiver node during the sampling is identified. A highest priority one of the occupied frequency channels is determined. The receiver node is tuned to the highest priority occupied frequency channel and receives a remainder of the message on the highest priority occupied frequency channel. The selecting, assigning, sending, sampling, identifying, determining and tuning steps are repeated for each of a plurality of subsequent selected subsets of the frequency channels. Each of the subsequent selected subsets is different from the first subset and from each other one of the subsequent selected subsets.

An advantage of the present invention is that it is robust against packet loss and interference. For example, dynamic shifting of frequency channels may provide robustness against interference.

Another advantage is that the present invention handles multiple simultaneous messages efficiently and reliably reduces both the overall delay to collect all messages and the delay in getting the first message.

Yet another advantage is that the present invention handles a large number of simultaneous messages without causing excessive delays in cases where only a few messages need to be handled.

A further advantage is that the present invention may feature a non-carrier sense protocol, and thus does not suffer from the hidden terminal problem.

Still another advantage is that the present invention may be easily implemented on computationally-limited sensor nodes.

A still further advantage is that the present invention may include an adaptive characteristic that enables operation without knowledge of the number of contending nodes.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
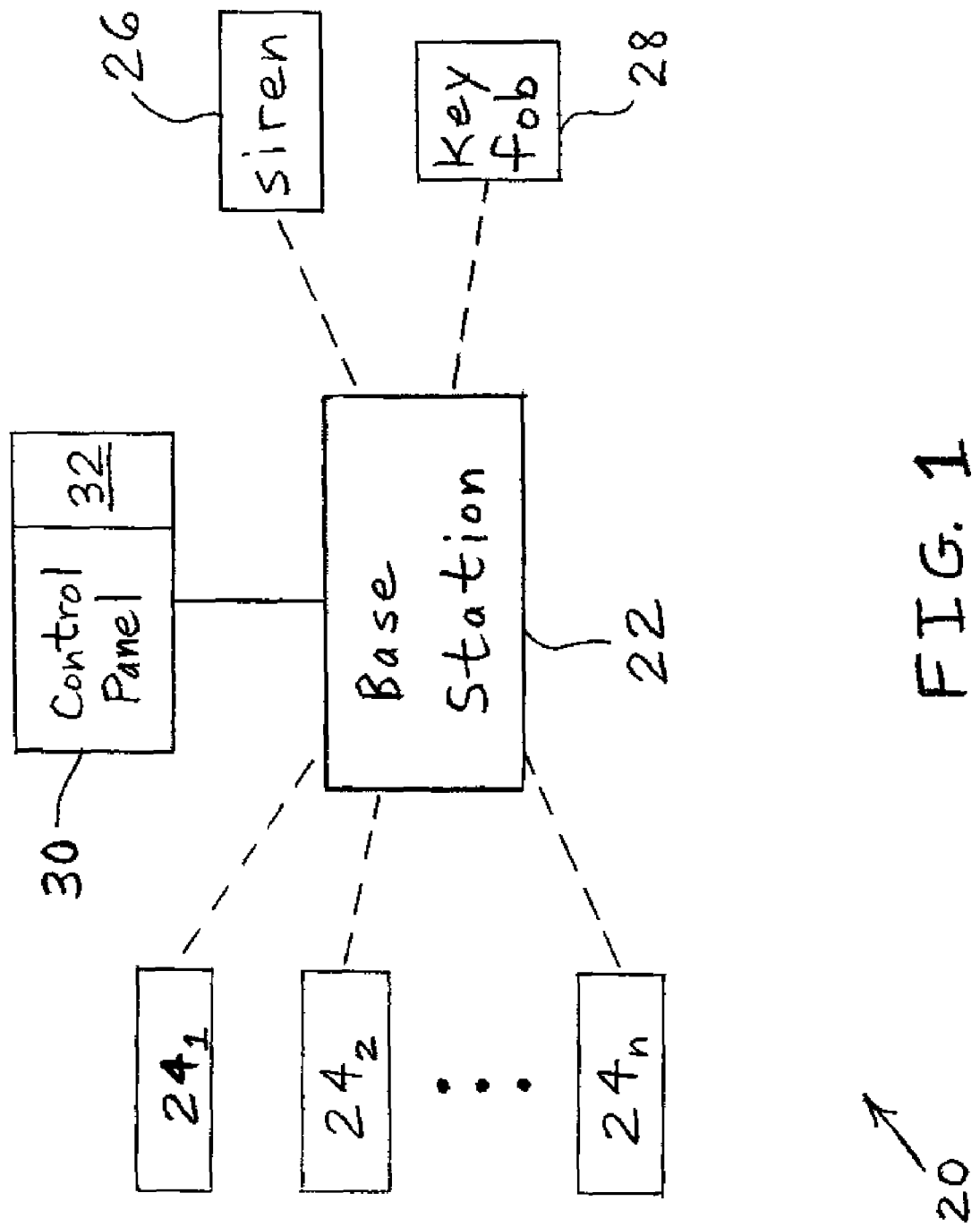
FIG. 1 is a block diagram of one embodiment of a wireless system suitable for use with the method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms and operations on data bits within a computer. It has proven convenient, primarily for reasons of common usage among those skilled in the art, to describe the invention in terms of algorithms and operations on data bits. It is to be understood, however, that these and similar terms are to be associated with appropriate physical elements, and are merely convenient labels applied to these physical elements. Unless otherwise stated herein, or apparent from the description, terms such as "calculating", "determining", "processing", "assigning", "selecting", "sending", "sampling", "tuning", "receiving" or "computing", or similar terms, refer the actions of a computing device that may perform these actions automatically, i.e., without human intervention, after being programmed to do so.

Referring now to the drawings and particularly to FIG. 1, there is shown one embodiment of a wireless network 20 suitable for use in conjunction with the method of the present invention. Network 20 includes a base station, i.e., hub 22, a plurality of sensors $24_1, 24_2, \ldots, 24_n$, a siren 26, a key fob 28 and a control panel 30 that may include a keypad 32. Control panel 30 may be hard wired to hub 22, while sensors $24_{1-n}$, siren 26 and key fob 28 are in wireless communication with hub 22, as indicated by the dashed lines in FIG. 1.

Base station 22 and control panel 30 may be powered by household alternating current, and sensors $24_1, 24_2, \ldots, 24_n$, siren 26 and key fob 28 may be battery powered. For sensors $24_1, 24_2, \ldots, 24_n$, siren 26 and key fob 28, base station 22 is the gateway to control panel 30, which the user can use to interact with the system.

The actions of the protocol of the present invention can be divided into those taken by a sender node, i.e., a node that has a message to send, and those taken by a receiver node, i.e., a node whose task is to collect these sent messages. For example, a sensor 24 may be a sender node, and hub 22 may be a receiver node. However, it is to be understood that it is possible within the scope of the invention for any of the nodes to be a sender node, a receiver node, or both a sender node and a receiver node, depending upon the particular application.

The time may be slotted, and each time slot may be used to exchange one data packet and its acknowledgment between a sender-receiver pair of nodes. All the nodes in the network are synchronized with each other. For example, a synchronization protocol may be responsible for maintaining a network-wide clock in the system. A simple yet efficient method of keeping the network synchronized may be to periodically broadcast time beacon messages to all nodes from a central node, such as base station 22.

In each time slot, multiple frequency channels may be used by the sender nodes or receiver nodes. These channels may have different priority levels. The receiver node may sample the channels one by one based on their priority level and may try to receive a packet from one of the sender nodes.

Figure 2A:
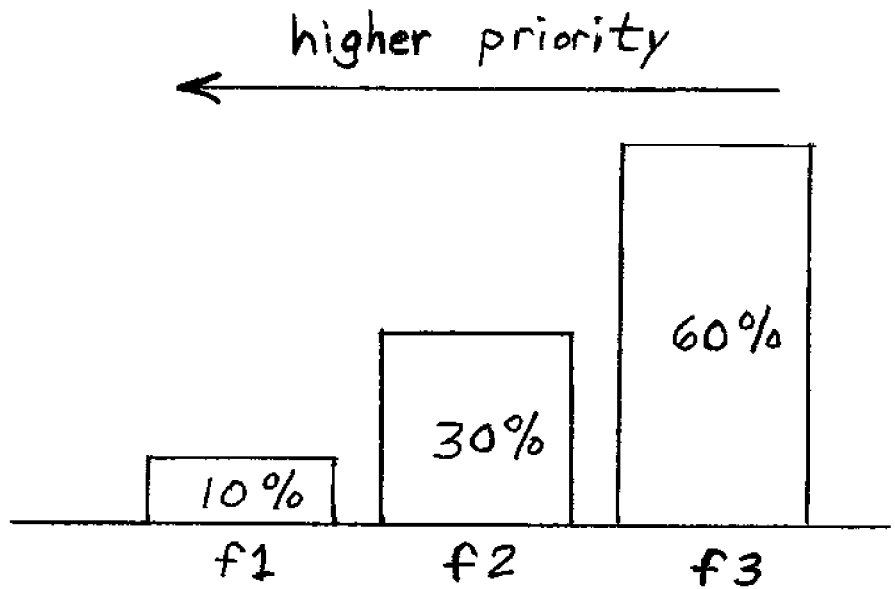
FIG. 2a is a diagram illustrating the selection probability of frequency channels according to channel priority according to one embodiment of a method of the present invention.

Each sender node may select a frequency channel probabilistically and independently of all other sender nodes, but the channels may not be selected with equal probability. A higher priority channel may be assigned less chance of being selected. That is, the selection probability may decrease with increasing channel priority. Priority may denote the order in which a frequency channel is checked, with higher priority channels being checked before lower priority channels. An example of this feature is illustrated in FIG. 2a wherein three channels are used in each time slot. The probability that a sender node selects the first channel f1 with the highest priority is p1=10%; the probability that a sender node selects the second channel f2 with the second highest priority is p2=30%; and the probability that a sender node selects the third channel with the lowest priority is p3=60%. This non-uniform probability distribution may be pre-specified and known to and executed by all sender nodes.

The non-uniform probability distribution may reduce the chance of collision among the sender nodes in the highest priority channel that is selected by any of the sender nodes, which is the channel from which a message is extracted and received. That is, the non-uniform probability distribution may increase the chance that the highest priority channel selected by any of the sender nodes will be selected by exactly one of the sender nodes. Because the receiver nodes checks the frequency channels in priority order, the non-uniform probability distribution may reduce the number of frequency channels that the receiver node must check before finding a channel wherein there is no collision, i.e., a channel that has been selected by only one sender node. Moreover, the non-uniform probability distribution may reduce the number of frequency channels that must be utilized in order to provide a reasonably high probability that at least one of the channels will be chosen by exactly one of the sender nodes in a given time slot.

Figure 2B:
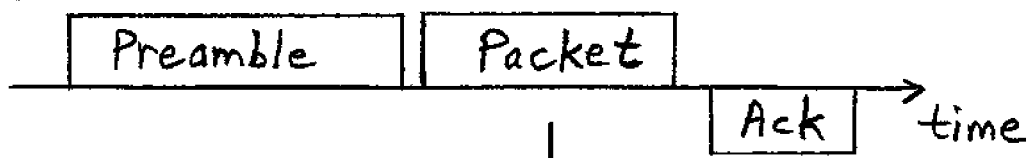
FIG. 2b is a timing diagram illustrating the transmissions between a sender node and a receiver node according to one embodiment of a method of the present invention.
Figure 2B:
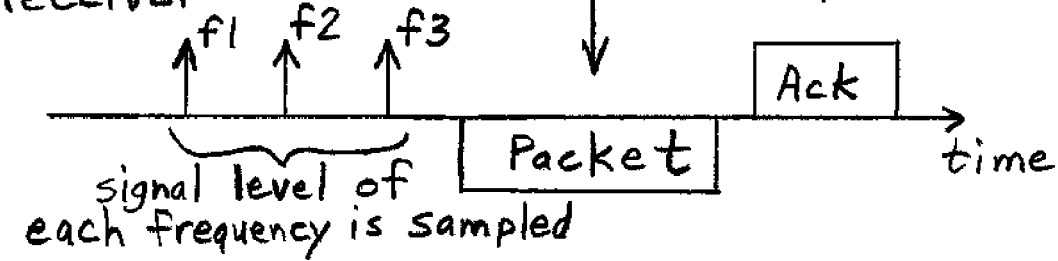

After a sender node stochastically selects a frequency channel based on the pre-specified channel selection probabilities, the sender node switches to check the selected frequency and sends a long preamble or tone to a receiver node. Then the sender node sends its data packet, as shown in FIG. 2b. After sending the data packet, the sender node expects an acknowledgment packet (Ack) from the receiver node. If the acknowledgment packet is received correctly by the sender node, the sender node stops. Otherwise, the sender node tries to send its message again in the next time slot.

At the beginning of each time slot, the receiver may sample the signal level on each of the frequency channels starting with the highest priority channel. If a high signal level, i.e., a high Received Signal Strength Indicator (RSSI), is sensed by the receiver node, then the receiver node may stay on the same frequency channel, locking to that channel, and does not sample any more channels. Then the receiver node may wait to receive a packet. If a packet is received correctly, the receiver node may send an acknowledgment packet back to the sender node in response. Otherwise, after some fixed timeout period, the receiver node may stop waiting to receive a packet and may continue to the next time slot. If the sensed high signal on a channel is due to simultaneous transmission of preambles by more than one sender node, then it may be likely that the received packets are corrupted. However, a packet may still be received correctly due to capture effect, such as if the correctly received packet has greater signal strength than the other simultaneously transmitted packet. If the high signal is due to interference or noise, then a packet does not arrive from any node, and the receiver node may simply repeat the procedure in the following time slot. If no high signal is detected on any of the channels for some number of consecutive time slots, then the receiver node may assume that there are no more senders and may stop monitoring for signals.

A transmitter node may not become aware of whether a receiver node has successfully "locked" onto the transmitter node's selected frequency channel and thus may transmit the packet even if the receiver node is waiting on some other channel. For some applications, a sender node has a message to send only very infrequently. For example, a typical security system installation may encounter a situation that requires sending fire alarms only once or twice per year. The rarity of alarms allows for greater effort to be put into reducing latency even at the cost of expending some additional energy. The receiver node, or centralized base station, may be powered from a wall outlet and therefore its energy consumption may not be an issue.

Figure 3:
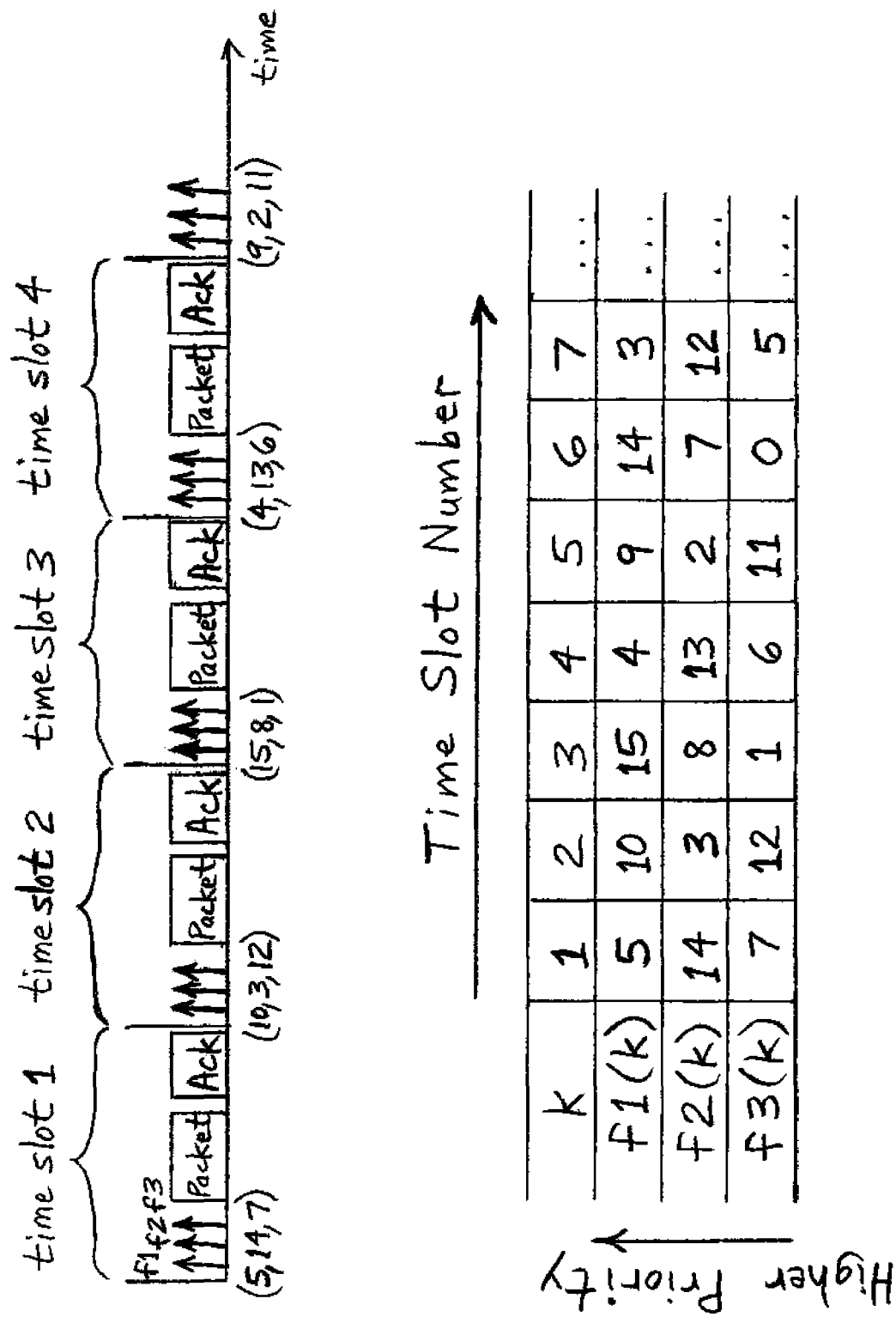
FIG. 3 is a timing diagram illustrating the varying of frequency channels used in each time slot according to one embodiment of a method of the present invention.

While the number of channels remains the same, the frequencies channels that are available for selection, and the frequency channels' respective priorities, can change across time slots, as illustrated in FIG. 3. The frequency table of FIG. 3 illustrates a simple embodiment wherein there are sixteen frequency channels numbered from 0 to 15 and $f_m(k)$ represents the $m^{th}$ frequency channel in $k^{th}$ time slot:

$$f_m(k)=[5k+9(m-1)] \mod 16 \; m=1, 2, 3$$

The frequency varying pattern may be fixed, predetermined, and/or pre-specified, and all the nodes in the network may be aware of this pattern. Varying or switching out the used (i.e., available for selection) frequency channels after each time slot may increase the reliability and robustness of the method against channel fading and interference.

The protocol of the present invention may avoid collisions among sender nodes occurring in each channel of a time slot such that in most time slots (i.e., with high probability) one message is received correctly. Therefore, the protocol can collect messages from all senders in a small number of time slots.

If there is only one sender node, then there will be no collision and it does not matter which frequency channel is selected by the sender node because the receiver node may find and lock to the frequency channel picked by the sender node. If two sender nodes are contending to send their messages, the sender node that selects the higher priority channel may be successful because the receiver node may hear that sender node's preamble/tone first and stay there awaiting its packet. If both sender nodes select the same channel, then a collision occurs. The channel selection probabilities may be chosen to reduce the chance of there being a collision in each frequency channel within a given time slot. The channel selection probabilities may be chosen to reduce the chance of there being a collision particularly in higher priority frequency channels.

The probabilities of collision may depend upon the number of sender nodes actively sending a message simultaneously. With one sender node, there will be no collision and it does not matter which frequency channel the sender node picks. With five total sender nodes transmitting according to the channel selection probability distribution of FIG. 2a, there is a high probability that only one of the five nodes picks the second channel (i.e., the middle channel having a 30% chance of being picked with each selection). As the number of sender nodes increases, it becomes more probable that at least one of the sender nodes selects a higher priority channel. With, say, thirteen sender nodes, one sender node is very likely to pick the highest priority channel (i.e., the channel having a 10% chance of being picked with each selection). In the event that only one sender node selects the higher priority channel, the message from that sender node will likely be successfully received.

Based on the protocol description above, it is clear that two design parameters are the number of frequency channels to use and the probability distribution over the channels. The values associated with these two parameters may be selected so as to reduce the overall time required to read all messages. A larger number of channels should decrease contention among the nodes that have messages to send. However, an increase in the number of channels also increases the duration of a time slot, which results in fewer time slots within a given period of time. Thus, there may be a tradeoff between the level of contention and number of messages that could potentially be communicated per unit time. The channel probability distribution may control the contention among the nodes. When the number of nodes with messages to send is large, assigning small probabilities to the higher priority channels may ensure lower contention for those channels. This lower level of contention may increase the chance that only one node chooses that higher priority channel. On the other hand, when the number of simultaneous messages to send is small, i.e., the load is low, assigning small probabilities to the higher priority channels could lead to under-utilization of these channels and higher utilization on the lower priority channels, resulting in collisions and an increase in the overall latency. As described below, the present invention may include a method of selecting the values of these design parameters in order to improve the performance of the protocol.

For final deployment, each node may be pre-loaded with information about the number of channels that are to be used in a time slot and the probability distribution according to which the channels are to be selected. These parameter values may be chosen while taking into account information about the application under consideration, such as the expected number of messages and the interference levels that can be expected and/or tolerated.

In order to determine desirable parameters to use in the protocol of the present invention, the particular application requirements may be considered. As for the channel selection probability distribution, let $p=(p1, p2, \ldots, pM)$ represent a row vector of channel probabilities corresponding to each channel $1, 2, \ldots, M$, wherein M represents the number of frequency channels in each time slot. The optimum distribution p may depend on the available information about the number of nodes (such as the maximum number of nodes that may simultaneously send, the average number of nodes that simultaneously send, etc.), information about interference and packet loss probability, and the performance metric that is to be optimized. Discussed below are methods that can be used to arrive at a desirable p distribution.

If minimizing the delay in receiving the first message is the performance metric that is to be optimized, then the distribution p may be calculated such that if multiple nodes send at the same time, the delay of receiving the first message is as small as possible. One embodiment of a method to find a desirable p is to calculate the probability of success that a message is sent successfully in a single slot and extend that to quantify the number of slots that will be required to read the first message, or all messages, as discussed below.

If minimizing the delay in collecting all messages is the performance metric that is to be optimized, then the distribution p may be calculated such that the overall time to collect all the messages from all the senders is minimized. Again, the probability of success of each time slot is first calculated and the results may be extended to find the average number of time slots required for all messages.

If maximizing the success probability over a range of possible number of sender nodes is the performance metric that is to be optimized, then the distribution p may be calculated via a model combining the previous two models. Such a solution may provide acceptable levels of delay for receiving the first message and also for collecting all messages.

Another application requirement that may be considered in selecting the design parameters is the optimum number of frequency channels in each time slot. When multiple nodes contend to send messages in a time slot, a larger number of channels decreases the contention among the sender nodes by increasing the likelihood that the sender nodes select different channels. Thus, one might think that as many channels as possible should be used per time slot. However, there are practical considerations that present a tradeoff. For example, for each channel used, the receiver has to sample the channel and switch to the next channel. Thus, for each channel used, there is a delay due to channel-sensing and channel-switching added to the duration of a time slot. On one hand, as the number of frequency channels is increased, the length of each time slot is increased. On the other hand, as the number of frequency channels is increased, there may be a greater probability of success, and therefore all messages may be collected in fewer time slots. Thus, selecting the number of frequency channels poses a tradeoff. The method of the present invention may include determining a number of frequency channels that optimizes the above-described tradeoff and minimizes the overall delay.

The performance of the method of the present invention may be evaluated through an implementation on commodity hardware and also through simulations. In one embodiment, Bosch CC2420-based wireless nodes are used as the sender and receiver nodes. The Bosch node boards use Chipcon/TI CC2420 radio which is an IEEE 802.15.4 compliant transceiver operating at 2.4 GHz band with Direct Sequence Spread Spectrum (DSSS) O-QPSK modulation and 250 Kbps data rate. Using this0 hardware, the present inventors implemented the method of the invention with the following fixed probability distribution for five frequency channels:

$p=(0.050, 0.063, 0.092, 0.182, 0.613)$.

In a first experimental setup, the inventors distributed fifteen sender nodes throughout their Bosch office in Palo Alto, Calif. in various rooms both near to and far away from a receiver base station. The receiver base station kept all the nodes in synchronization by sending periodic time beacon messages. Every second, all the nodes sent a message simultaneously. The receiver measured the number of time slots required to receive the first message and the number of time slots needed to collect all fifteen messages from all nodes.

Figure 4A:
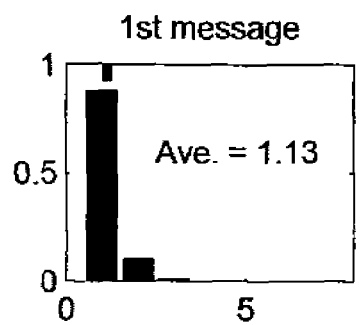
FIG. 4a is a plot illustrating an experimentally measured distribution of the number of time slots needed to successfully send and receive a first message for a first experimental setup.
Figure 4D:
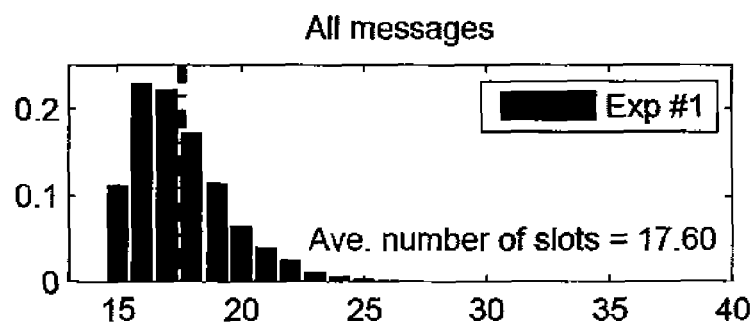
FIG. 4d is a plot illustrating an experimentally measured distribution of the number of time slots needed to successfully send and receive all messages for a first experimental setup.
Figure 4B:
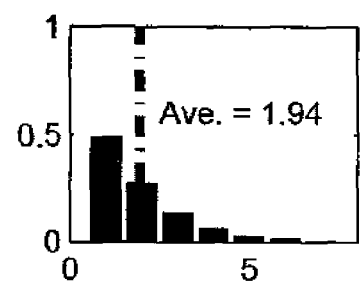
FIG. 4b is a plot illustrating an experimentally measured distribution of the number of time slots needed to successfully send and receive the first message for a second experimental setup.
Figure 4E:
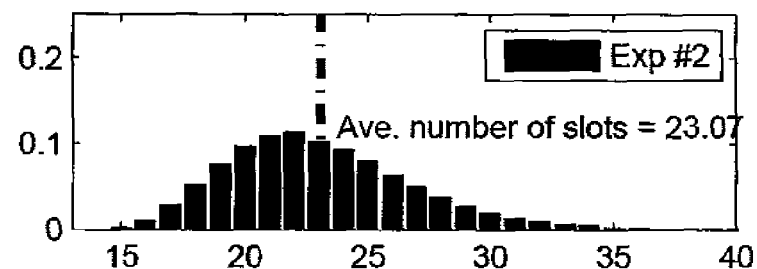
FIG. 4e is a plot illustrating an experimentally measured distribution of the number of time slots needed to successfully send and receive all messages for a second experimental setup.
Figure 4C:
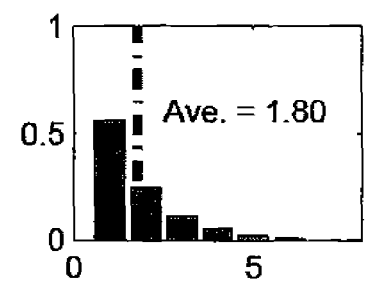
FIG. 4c is a plot illustrating the theoretical distribution of the number of time slots needed to successfully send and receive the first message.
Figure 4F:
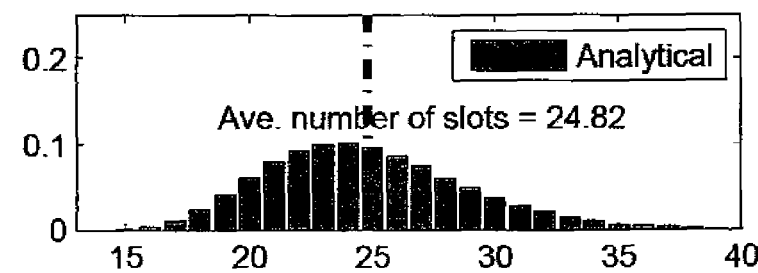
FIG. 4f is a plot illustrating the theoretical distribution of the number of time slots needed to successfully send and receive all messages.

FIGS. 4a-f illustrate the empirical and theoretical distributions of the number of time slots need to receive the first message and all the messages. More particularly, FIGS. 4a and 4b illustrate the experimentally measured distribution of the number of time slots needed to successfully send and receive the first message for the first experimental setup discussed above and the second experimental setup discussed below, respectively. FIG. 4c illustrates the analytical or theoretical results for the first message. FIGS. 4d and 4e illustrate the experimentally measured distribution of the number of time slots needed to successfully send and receive all messages for the first experiment setup discussed above and the second experiment setup discussed below, respectively. FIG. 4f illustrates the analytical or theoretical results for all messages.

A comparison of FIGS. 4d and 4f reveals that the protocol performed better in real-world deployment (the first experiment setup described above) than what the analysis predicts. The calculations show that, on average, 24.82 time slots are theoretically needed for the receiver node to collect messages from all fifteen sender nodes. However, in the first experimental setup, an average of only 17.60 time slots were needed for the receiver node to collect messages from all fifteen sender nodes. The reason the actual performance was better than the theoretical performance may be due to the capture effect. That is, the theoretical calculations assumed that when two nodes send messages simultaneously, the receiver node is not able to receive either message and there is a failure. However, in actuality, in many cases the receiver node can correctly decode one of the packets while treating the signal from the other sender node as noise. Because the CC2420 radio employs spread spectrum techniques, it can tolerate a higher level of interference, and this helps increase the chance of capture effect.

In order to reduce the chance of the capture effect and validate the analytical model, the experiment was repeated with a different, second setup in which all of the fifteen sender nodes were placed close to each other and close to the receiver on a table in the same room. Because all nodes are close to one another, the receiver node receives the same high and equal level of power from all sender nodes, which reduces the chance of capture effect. The results of this experimental setup are shown in FIGS. 4b and 4e. A comparison of FIGS. 4b and 4e to the theoretical results shown in FIGS. 4c and 4f reveals that the measurements distribution with the second setup very closely matches what the analysis predicts.

In the description of the method of the present invention described above, each sender node that has a message may select one of the frequency channels and send its packet in all time slots until it receives an acknowledgment packet from the receiver node. However, in another embodiment of the method of the present invention, the sender nodes do not aggressively send their packet in all the time slots. For example, the number of frequency channels may be increased from M to (M+1) where the last channel represents the case where the sender node does not send any packet. With this modification, the receiver node operates as described above in the previous embodiment, but for the sender nodes, if any sender node selects the (M+1)th channel in a time slot, then that sender node does not send its packet in that time slot.

In the embodiments discussed above, a single set of channel probabilities p is used throughout the execution of the method of the present invention. Though this results in a simpler implementation, better performance or robustness to the number nodes may be achieved by adapting or varying these probabilities as the protocol executes.

Different methods can be used to adapt or vary the probabilities used by the sender nodes. For example, the sender nodes may adapt their corresponding probability distributions p based on the urgency of the message or the number of time slots that they have tried and failed in previously. The necessary distribution can be pre-calculated and stored in the memories of all the nodes (a probability distribution matrix).

In another embodiment, the receiver node decides on the probability distribution p used by all the sender nodes. The receiver node's choice of the probability distribution p may be based on an estimate by the receiver node of the number of potential sender nodes. The information about the selected probability distribution can be communicated by the receiver node to the sender nodes in acknowledgment packets or through separate control packets in allocated control time slots.

Figure 5:
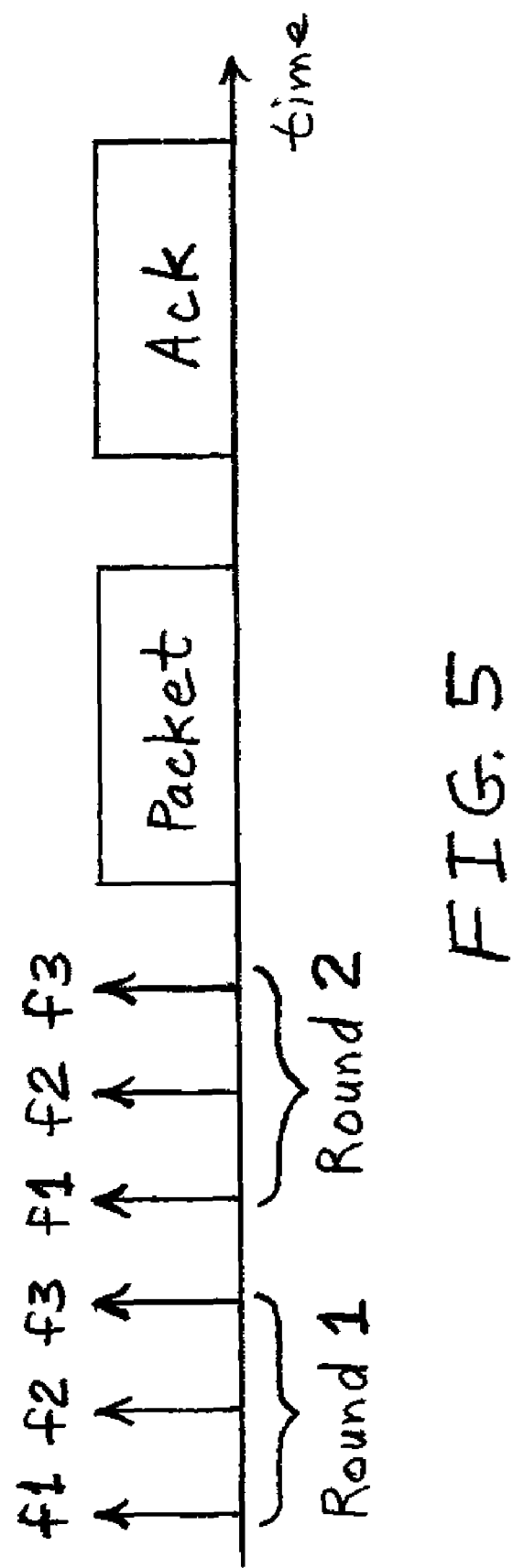
FIG. 5 is a timing diagram illustrating multiple rounds of frequency channel sampling according to another embodiment of a method of the present invention.

The receiver node, during the execution of the embodiments described above, may sample each channel only once and lock to the first non-idle channel found by the receiver node. In another embodiment, the receiver node takes multiple samples for each frequency channel instead of only one. The samples on the same channel can be back-to-back, i.e., consecutive. Alternatively, in a round of sampling, each of the channels may be sampled once in sequence, and this round of sampling may be repeated multiple times. This embodiment is illustrated in FIG. 5 with two rounds of sampling three frequency channels.

An advantage of using multiple samples is the increased robustness to interference and reduced chance that noise interference causes the receiver to lock to a channel where no sender node is actually transmitting. After sampling all frequency channels for R number of rounds, the receiver node may elect different decision methods to choose the channel the receiver node starts listening to and expects to receive the packet in. In one embodiment of a simple decision algorithm, a threshold R0, which is less than R, is selected, wherein there are R samples for each channel. If in R0 or more samples the signal level is high, the channel is assumed to be non-idle (meaning that at least one of the sender nodes has selected this channel and is transmitting on this channel). Then the receiver node may select the highest-priority non-idle channel (as defined by this embodiment) to start listening to.

As described above, the method of the present invention may include using multiple frequency channels having different priorities in a single time slot. Each sender node that has a message to send independently selects one channel based on a channel selection probability distribution. The receiver node samples each frequency in the priority order and locks to the highest priority channel, i.e., the first channel on which a signal is sensed, on which the receiver node thus expects to receive a message.

In other embodiments, the frequency channel selection by the sender nodes may be performed differently. For example, fixed, predetermined channels may be used by each sender node in all time slots. In another example, the channels used by the sender nodes change in each time slot based on a predetermined pattern that is known by the sender nodes and the receiver node.

In other embodiments, the channel selection probability distribution used by the sender nodes may be determined according to different methods. For example, in one embodiment, a fixed probability distribution is used by all sender nodes. In another embodiment, fixed but different probability distributions are used by different sender nodes in the network. That is, the probability distributions remain constant and do not change with time, but different sender nodes in the network use different probability distributions. In yet another embodiment, the sender nodes use different channel selection probabilities based on the type of message. For example, the channel selection probabilities may be based on the importance or urgency of the message.

In other embodiments, the probability distribution used by the sender nodes changes over time. For example, the sender nodes may adapt their probability distribution based on the urgency of the message or the number of failed attempts that have been made to transmit the message. In another embodiment, the receiver node controls and determines the probability distribution. For example, the selected distribution can be communicated by the receiver node to the sender nodes in the acknowledgment packets or through separate control packets.

In yet other embodiments, the receiver node samples each frequency channel multiple times, i.e., in multiple rounds. After sampling all the channels multiple times, the receiver node can use different methods to determine the main frequency to listen to. For example, receiver node may select the highest priority channel that has high RSSI in more than half of the samples.

Figure 6:
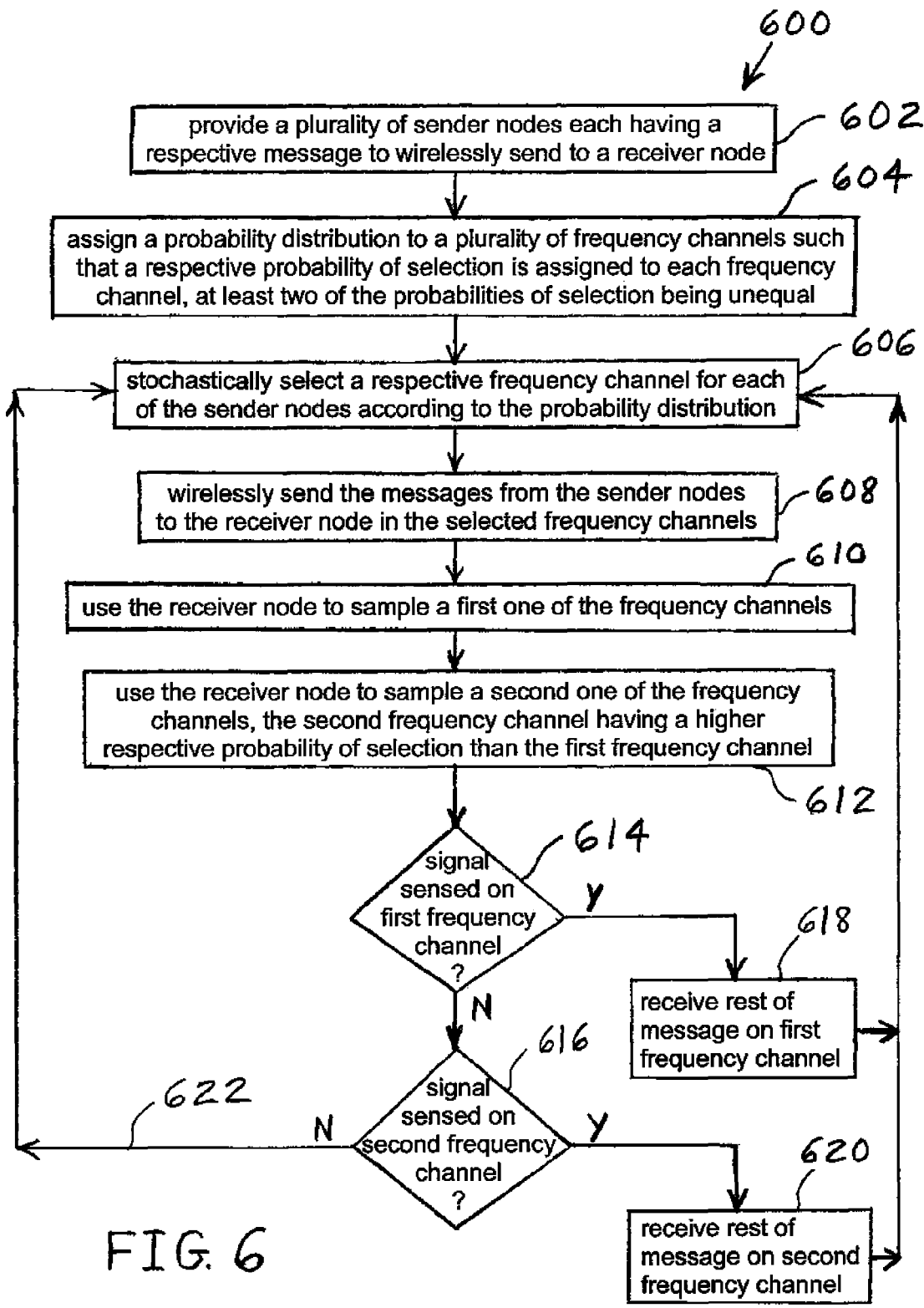
FIG. 6 is a flow chart illustrating one embodiment of a method of the present invention for operating wireless devices.

One embodiment of a method 600 of the present invention for operating wireless devices is illustrated in FIG. 6. In a first step 602, a plurality of sender nodes are provided, each having a respective message to wirelessly send to a receiver node. For example, as shown in FIG. 1, each of sender nodes 24 may have a respective message to wirelessly send to a receiver node in the form of base station 22.

In a next step 604, a probability distribution is assigned to a plurality of frequency channels such that a respective probability of selection is assigned to each frequency channel, at least two of the probabilities of selection being unequal. As shown in FIG. 2a, frequency channels f1, f2 and f3 have been assigned a probability distribution such that probabilities of selection of 10%, 30% and 60% are assigned to frequency channels f1, f2 and f3, respectively.

Next, in step 606, a respective frequency channel is stochastically selected for each of the sender nodes according to the probability distribution. For example, each of sender nodes 24 may include a random number generator or some other device that enables each of nodes 24 to select one of frequency channels f1, f2 and f3 according to the probabilities shown in FIG. 2a. As a numerical example, assume there are four sender nodes 24, and three of nodes 24 probabilistically select frequency channel f3 (having a 60% of being selected by any given node) and the other node 24 probabilistically selects frequency channel f2 (having a 30% of being selected by any given node).

In step 608, the messages are wirelessly sent from the sender nodes to the receiver node in the selected frequency channels. In the numerical example provided above, three of nodes 24 may simultaneously send their respective messages in channel f3, and, also simultaneously, the other node 24 may send its message in channel f2.

In a next step 610, the receiver node is used to sample a first one of the frequency channels. That is, base station 22 may sample the signal level of frequency channel f1, as indicated by the upward-pointing arrow f1 in FIG. 2b. However, because no sender node selected channel f1, base station 22 may not sense any signal on channel f1.

Next, in step 612, the receiver node is used to sample a second one of the frequency channels, the second frequency channel having a higher respective probability of selection than the first frequency channel. For example, base station 22 may sample the signal level of frequency channel f2, as indicated by the upward-pointing arrow f2 in FIG. 2b. As shown in FIG. 2a, channel f2 has a higher probability of selection (30%) than channel f1 (10%).

Because no sender node 24 selected channel f1 no signal is sensed on channel f1 in step 614 and operation hence proceeds to step 616. However, if one of the sender nodes had selected channel f1, then the receiver node would likely sense a signal on channel f1, and operation would proceed to step 618 where the receiver node would receive the remainder of the message on channel f1. For example, the remainder of the message may be in the form of a packet, as shown in FIG. 2b. After the receiver node possibly sends an acknowledgment to the sender nodes, as also shown in FIG. 2b, operation reverts back to step 606, where each of the sender nodes may select a new respective frequency channel.

In step 616, although no signal was sensed on channel f1, the receiver node is likely to sense a signal on channel f2 because one of the sender nodes selected channel f2. In this case, operation continues to step 620 where the receiver node receives the remainder of the message on channel f2. For example, the remainder of the message may be in the form of a packet, as shown in FIG. 2b. After the receiver node possibly sends an acknowledgment to the sender nodes, as also shown in FIG. 2b, operation reverts back to step 606, where each of the sender nodes may select a new respective frequency channel.

If two of the sender nodes had selected channel f2 and the other two had selected f3, there may be a packet collision in channel f2. In the case of such a collision, the receiver node may not be able to receive any discernable message. Thus, no acknowledgment packet may be sent by the receiver node, or the acknowledgment packet may indicate that no message was successfully received. Nevertheless, operation reverts to step 606 where attempts to successfully communicate the messages are continued.

If all four of the sender nodes had selected channel f3, then no signal is sensed on either of channels f1 and f2, and the receiver node may sample channel f3 (which the receiver node may do regardless of whether a signal was sensed on either channel f1 or f2). However, because of the four-way collision in channel f3, the receiver node would not likely be able to interpret what appears to be a signal on f3. Thus, no acknowledgment packet may be sent by the receiver node, or the acknowledgment packet may indicate that no message was successfully received. Nevertheless, operation would eventually revert to step 606, as indicated at 622 in FIG. 6, where further attempts to communicate the messages would take place.

Figure 7:
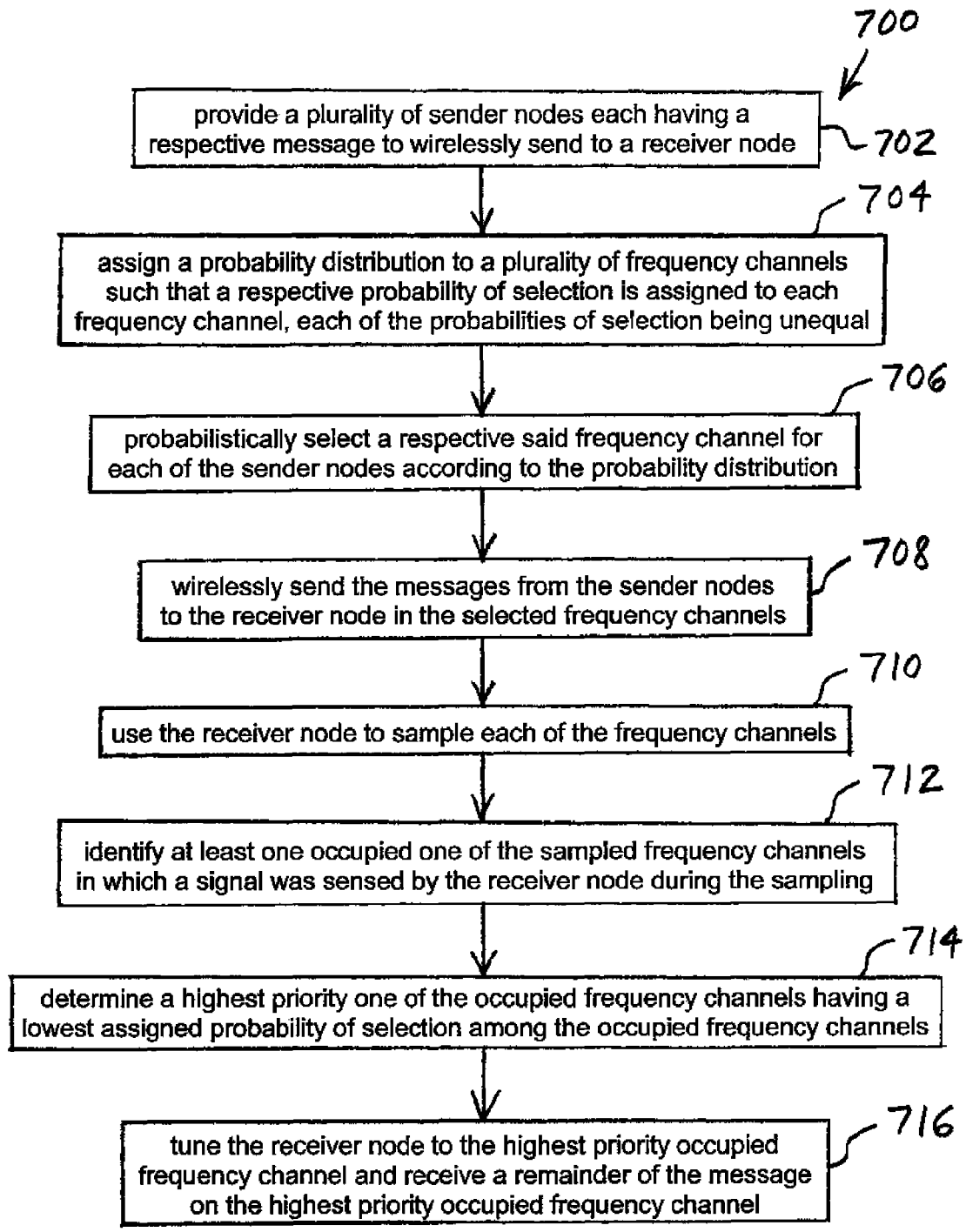
FIG. 7 is a flow chart illustrating another embodiment of a method of the present invention for operating wireless devices.

Another embodiment of a method 700 of the present invention for operating wireless devices is illustrated in FIG. 7. Steps 702 through 708 substantially correspond to steps 602 through 608 in FIG. 6, and thus steps 702 through 708 will not be described in detail to avoid needless repetition. In step 710, the receiver node is used to sample each of the frequency channels. For example, as indicated by upwardly directed arrows f1, f2 and f3 in FIG. 2b, the receiver node may sample each of frequency channels f1, f2 and f3.

In a next step 712, at least one occupied one of the sampled frequency channels in which a signal was sensed by the receiver node during the sampling is identified. For example, in the numerical example provided above with reference to method 600, one sender node selects channel f2 and three other sender nodes select channel f3. Thus, two occupied frequency channels f2 and f3 in which a signal was sensed by the receiver node during the sampling are identified.

Next, in step 714, a highest priority one of the occupied frequency channels having a lowest assigned probability of selection among the occupied frequency channels is determined. For example, among the occupied frequency channels f2 and f3, channel f2 has the lower assigned probability of selection (30% versus 60% for channel f3), and thus is determined as the highest priority one of the occupied frequency channels.

In a final step 716, the receiver node is tuned to the highest priority occupied frequency channel and receives a remainder of the message on the highest priority occupied frequency channel. For example, in the numerical example discussed above, the receiver node locks into the highest priority occupied frequency channel f2 and receives a remainder of the message, such as a data packet, on channel f2.

Figure 8:
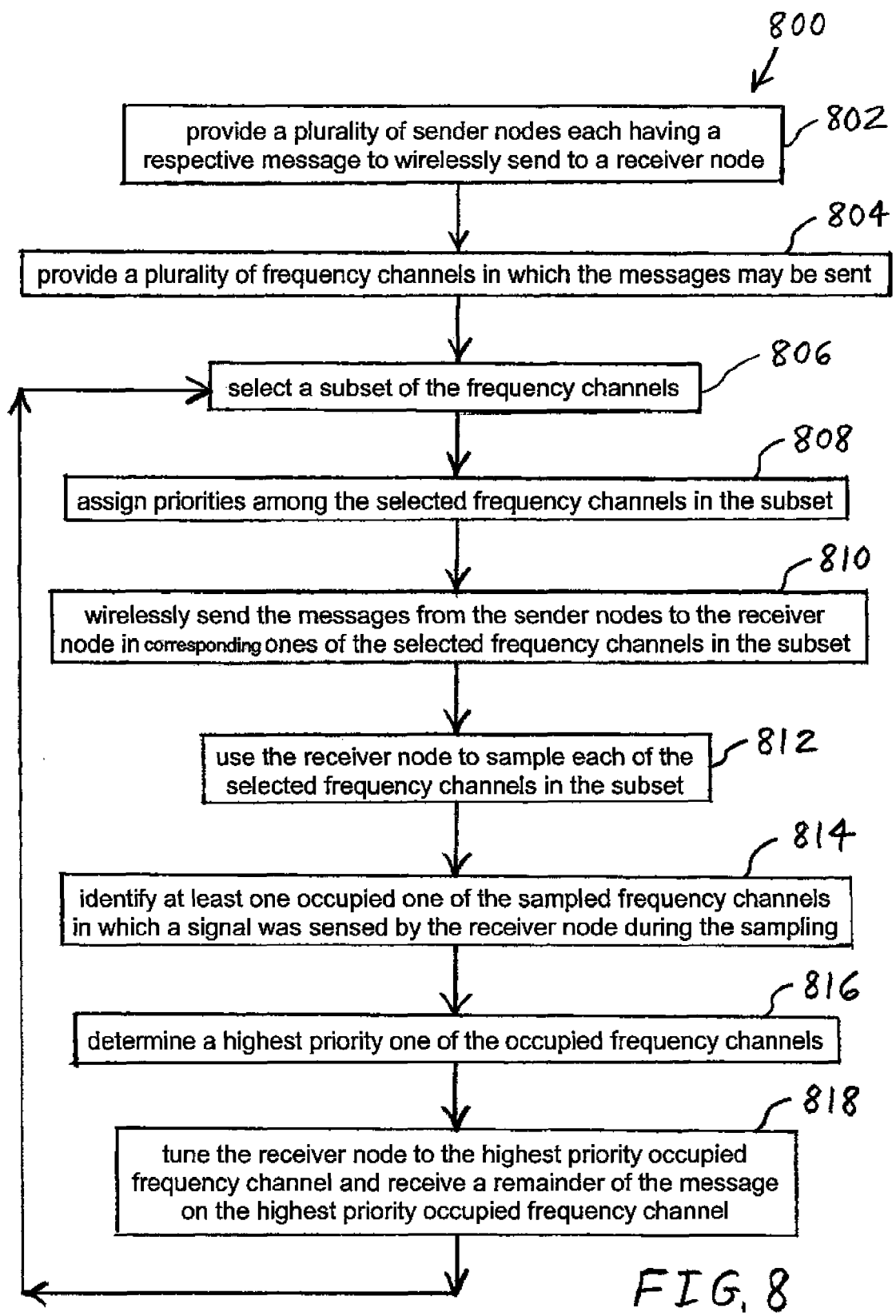
FIG. 8 is a flow chart illustrating yet another embodiment of a method of the present invention for operating wireless devices.

Yet another embodiment of a method 800 of the present invention for operating wireless devices is illustrated in FIG. 8. In a first step 802, a plurality of sender nodes are provided, each having a respective message to wirelessly send to a receiver node. For example, as shown in FIG. 1, each of sender nodes 24 may have a respective message to wirelessly send to a receiver node in the form of base station 22.

In a next step 804, a plurality of frequency channels in which the messages may be sent are provided. For example, in the embodiment illustrated in FIG. 3, sixteen frequency channels 0-15 in which data packets may be sent are provided.

Next, in step 806, a subset of the frequency channels is selected. For example, in time slot 1 in FIG. 3, a subset including frequency channels 5, 14 and 7 is selected.

In a next step 808, priorities are assigned among the selected frequency channels in the subset. That is, as indicated by the "Higher Priority" arrow on the left-hand side of FIG. 3, channel 5 is assigned the highest priority, channel 14 is assigned the second highest priority, and channel 7 is assigned the lowest priority.

Step 810 includes wirelessly sending the messages from the sender nodes to the receiver node in corresponding ones of the selected frequency channels in the subset. For example, a number of sender nodes wirelessly send their respective messages to the receiver node in probabilistically selected ones of channels 5, 14 and 7. Each sender node may use a probability distribution such as shown in FIG. 2a in selecting the frequency channel in which the sender node will transmit its message. Thus, it is possible for any of channels 5, 14 and 7 to be selected by multiple sender nodes or to not be selected by any sender nodes.

Next, in step 812, the receiver node is used to sample each of the selected frequency channels in the subset. As indicated by the upwardly-pointed arrows f1, f2 and f3 in time slot 1 in the upper portion of FIG. 3, the receiver node samples each of selected frequency channels 5, 14 and 7.

In a next step 814, at least one occupied one of the sampled frequency channels in which a signal was sensed by the receiver node during the sampling is identified. As a simple numerical example, assume that there are at least three sender nodes, and each of frequency channels 5, 14 and 7 is selected by at least one of the sender nodes. Thus, the receiver node may sense a signal in all three of the frequency channels 5, 14 and 7, and each of the three channels may be identified as being occupied.

In step 816, a highest priority one of the occupied frequency channels is determined. Because the highest priority channel 5 is occupied, channel 5 is determined to be the highest priority one of the occupied frequency channels.

In a final step 818, the receiver node is tuned to the highest priority occupied frequency channel, and the receiver node receives a remainder of the message on the highest priority occupied frequency channel. For example, the receiver node may be locked into channel 5, and the receiver node may then receive the data packet in time slot 1 on channel 5.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating wireless devices, the method comprising the steps of:
   providing a plurality of sender nodes each having a respective message to wirelessly send to a receiver node;
   assigning a probability distribution to a plurality of frequency channels such that a respective probability of selection is assigned to each said frequency channel;
   assigning a priority to each of the frequency channels based on the channel selection probability such that the channels with smaller probability of selection are assigned higher priority level;
   stochastically selecting a respective said frequency channel for each of the sender nodes according to the probability distribution;
   wirelessly sending the messages from the sender nodes to the receiver node in the selected frequency channels;
   using the receiver node to sample a first one of the frequency channels with the highest priority;
   if the receiver node sensed a signal in the first frequency channel during the sampling, tuning the receiver node to the first frequency channel and receive a remainder of the message on the first channel; and
   if the receiver node sensed no signal in first frequency channel, using the receiver node to sample a second one of the frequency channels with lower priority level.

2. The method of claim 1 comprising the further step of repeating the sampling step.

3. The method of claim 2 wherein the sampling step is repeated immediately following completion of the initial sampling step.

4. The method of claim 1 wherein the at least two of the probabilities of selection are unequal.

5. The method of claim 1, comprising the further steps of:
   repeating the step of stochastically selecting a respective said frequency channel for each of the sender nodes according to the probability distribution;
   wirelessly resending unreceived ones of the messages from the sender nodes to the receiver node in the selected frequency channels; and
   using the receiver node to sample the first and second frequency channels.

6. The method of claim 1 wherein the messages are wirelessly sent substantially simultaneously.

7. The method of claim 1 wherein each of the sender nodes independently performs the step of stochastically selecting a respective said frequency channel for itself.

8. A method of operating wireless devices, the method comprising the steps of:
   providing a plurality of sender nodes each having a respective message to wirelessly send to a receiver node;
   assigning a probability distribution to a plurality of frequency channels such that a respective probability of selection is assigned to each said frequency channel;
   probabilistically selecting a respective said frequency channel for each of the sender nodes according to the probability distribution;
   wirelessly sending the messages from the sender nodes to the receiver node in the selected frequency channels;
   using the receiver node to sample each of the frequency channels;
   identifying at least one occupied one of the sampled frequency channels in which a signal was sensed by the receiver node during the sampling;
   determining a highest priority one of the occupied frequency channels, the highest priority occupied frequency channel having a lowest assigned probability of selection among the occupied frequency channels; and
   tuning the receiver node to the highest priority occupied frequency channel and receiving a remainder of the message on the highest priority occupied frequency channel.

9. The method of claim 8 comprising the further step of repeating the sampling step.

10. The method of claim 9 wherein the sampling step is repeated immediately following completion of the initial sampling step.

11. The method of claim 10 wherein the identifying step comprises identifying at least one occupied one of the sampled frequency channels in which a signal was sensed by the receiver node in at least a threshold number of the sampling steps, the threshold number being less than a total number of the sampling steps.

12. The method of claim 8, comprising the further steps of:
    repeating the step of probabilistically selecting a respective said frequency channel for each of the sender nodes according to the probability distribution;
    wirelessly resending unreceived ones of the messages from the sender nodes to the receiver node in the selected frequency channels; and
    using the receiver node to sample each of the frequency channels.

13. The method of claim 8 wherein the messages are wirelessly sent substantially simultaneously.

14. The method of claim 8 wherein each of the sender nodes independently performs the step of probabilistically selecting a respective said frequency channel for itself.

15. A method of operating wireless devices, the method comprising the steps of:
    providing a plurality of sender nodes each having a respective message to wirelessly send to a receiver node;
    providing a plurality of frequency channels in which the messages may be sent;
    selecting a first subset of the frequency channels;
    assigning priorities among the selected frequency channels in the first subset;
    wirelessly sending the messages from the sender nodes to the receiver node in corresponding ones of the selected frequency channels in the first subset;
    using the receiver node to sample each of the selected frequency channels in the first subset;
    identifying at least one occupied one of the sampled frequency channels in which a signal was sensed by the receiver node during the sampling;
    determining a highest priority one of the occupied frequency channels;
    tuning the receiver node to the highest priority occupied frequency channel and receiving a remainder of the message on the highest priority occupied frequency channel; and
    repeating the selecting, assigning, sending, sampling, identifying, determining and tuning steps for each of a plurality of subsequent selected subsets of the frequency channels, each of the subsequent selected subsets being different from the first subset and from each other one of the subsequent selected subsets.

16. The method of claim 15, wherein the method is repeated until all of the messages from the sender nodes are received by the receiver node.

17. The method of claim 15 wherein a first of the frequency channels has a higher assigned priority than a second of the frequency channels within the first selected subset of the frequency channels and a lower assigned priority than the second frequency channel within one of the subsequent selected subsets of the frequency channels.

18. The method of claim 15 wherein each of the frequency channels is sampled multiple times for each of the subsets of frequency channels.

19. The method of claim 18 wherein the identifying step comprises identifying at least one occupied one of the sampled frequency channels in which a signal was sensed by the receiver node in at least a threshold number of the samplings, the threshold number being less than a total number of the samplings.

20. The method of claim 15 wherein the messages are sent substantially simultaneously from the sender nodes to the receiver node.

* * * * *